United States Patent [19]

Nothnagel

[11] Patent Number: 5,356,988

[45] Date of Patent: Oct. 18, 1994

[54] ACRYLIC POLYMER AQUEOUS DISPERSION MADE THROUGH A MICRO DISPERSION

[75] Inventor: Joseph L. Nothnagel, Maple Grove, Minn.

[73] Assignee: Cargill, Incorporated, Minneapolis, Minn.

[21] Appl. No.: 901,934

[22] Filed: Jun. 22, 1992

Related U.S. Application Data

[63] Continuation-in-part of Ser. No. 731,489, Jul. 17, 1991, abandoned.

[51] Int. Cl.$^5$ .................. C08F 6/24; C08K 5/06; C08L 33/08
[52] U.S. Cl. .................. 524/556; 524/376; 524/801; 523/336; 523/337; 523/339; 525/329.9
[58] Field of Search .................. 523/336, 337, 339; 524/376, 556, 801; 525/329.9

[56] References Cited

U.S. PATENT DOCUMENTS

| | | | |
|---|---|---|---|
| Re. 28,474 | 7/1974 | Anderson et al. | 260/29.6 |
| Re. 28,576 | 10/1975 | Anderson et al. | 260/29.6 |
| Re. 31,936 | 7/1985 | Sperry et al. | 524/522 |
| 2,313,144 | 3/1943 | Gomm | 260/32 |
| 2,460,582 | 2/1949 | Japs | 260/29.6 |
| 2,606,164 | 8/1952 | Henson et al. | 260/23 |
| 3,296,172 | 1/1967 | Funck et al. | 260/29.6 |
| 3,301,810 | 1/1967 | Hunter et al. | 260/29.7 |
| 3,562,196 | 2/1971 | Bissot | 260/23 |
| 3,642,676 | 2/1972 | Saunders et al. | 260/23 |
| 3,852,234 | 12/1974 | Venema | 260/29.6 |
| 3,879,327 | 4/1975 | Burke, Jr. | 260/29.6 |
| 3,941,727 | 3/1976 | Timmerman et al. | 260/8 |
| 3,980,602 | 9/1976 | Jakubauskas | 260/29.6 |
| 3,994,848 | 11/1976 | Dunlop et al. | 260/29.2 |
| 4,021,399 | 5/1977 | Hunter et al. | 260/29.6 |
| 4,022,731 | 5/1977 | Schmitt | 260/29.6 |
| 4,022,736 | 5/1977 | Schmitt | 260/29.6 |
| 4,022,741 | 5/1977 | Tuka et al. | 260/29.4 |
| 4,042,645 | 8/1977 | Hirota et al. | 260/830 |
| 4,051,065 | 9/1977 | Venema | 252/359 |
| 4,062,817 | 12/1977 | Westerman | 260/17.45 |
| 4,064,092 | 12/1977 | Burroway et al. | 260/29.6 |
| 4,073,763 | 2/1978 | Tai | 260/29.4 |
| 4,146,499 | 3/1979 | Rosano | 252/186 |
| 4,255,308 | 3/1981 | Brasen | 260/29.6 |
| 4,261,946 | 4/1981 | Goyert et al. | 264/211 |

(List continued on next page.)

FOREIGN PATENT DOCUMENTS

| | | |
|---|---|---|
| 118009 | 9/1984 | European Pat. Off. . |
| 183119 | 6/1988 | European Pat. Off. . |
| 288763 | 11/1988 | European Pat. Off. . |
| 305850 | 3/1989 | European Pat. Off. . |
| 346886 | 12/1989 | European Pat. Off. . |
| 350040 | 1/1990 | European Pat. Off. . |
| 2011057 | 9/1970 | Fed. Rep. of Germany . |
| 1123285 | 11/1968 | United Kingdom . |
| 1291392 | 10/1972 | United Kingdom . |
| 2207140 | 1/1989 | United Kingdom . |

OTHER PUBLICATIONS

Mcewan, *Aqueous Dispersion Enamael A New Automotive Topcoat Technology,* 2 J. of Water Borne Coatings 3 (1979).

Brendley et al. *Chemistry and Technology of Acrylic Resins for Coatings,* ACS Symposium Series 285 (1985).

*Primary Examiner*—Paul R. Michl
*Assistant Examiner*—Andrew E. Merriam
*Attorney, Agent, or Firm*—Fitch, Even, Tabin & Flannery

[57] ABSTRACT

Aqueous dispersions of amine and ammonia salts of acrylic polymers having an acid value of from about 15 to about 100 and less than 2 weight percent organic solvent and a method of making such dispersions are described.

14 Claims, No Drawings

U.S. PATENT DOCUMENTS

| | | | |
|---|---|---|---|
| 4,314,922 | 2/1982 | Lehner et al. | 260/29.2 |
| 4,316,929 | 2/1982 | McIntire et al. | 428/262 |
| 4,328,282 | 5/1982 | Lehner et al. | 428/425.9 |
| 4,334,034 | 6/1982 | Lehner et al. | 525/28 |
| 4,357,221 | 11/1982 | Lehner et al. | 204/181 |
| 4,363,886 | 12/1982 | Lipowski et al. | 523/336 |
| 4,366,293 | 12/1982 | Tobias | 525/301 |
| 4,435,528 | 3/1984 | Domina | 523/332 |
| 4,458,040 | 7/1984 | Suzuki et al. | 523/412 |
| 4,503,172 | 3/1985 | Farrar et al. | 523/336 |
| 4,524,175 | 6/1985 | Stanley, Jr. | 524/831 |
| 4,554,298 | 11/1985 | Farrar et al. | 523/336 |
| 4,579,888 | 4/1986 | Kodama et al. | 523/412 |
| 4,591,609 | 5/1986 | Kubo et al. | 523/336 |
| 4,650,827 | 3/1987 | Becker et al. | 524/801 |
| 4,665,107 | 5/1987 | Micale | 523/105 |
| 4,714,728 | 12/1987 | Graham et al. | 524/272 |
| 4,730,021 | 3/1988 | Zom et al. | 524/457 |
| 4,758,625 | 7/1988 | Boyack et al. | 525/123 |
| 4,798,861 | 1/1989 | Johnson et al. | 524/458 |
| 4,888,383 | 12/1989 | Huybrechts | 524/832 |
| 5,051,464 | 9/1991 | Johnson et al. | 525/131 |
| 5,068,266 | 11/1991 | Kojima et al. | 523/336 |
| 5,102,946 | 4/1992 | Chen et al. | 524/522 |

ACRYLIC POLYMER AQUEOUS DISPERSION MADE THROUGH A MICRO DISPERSION

This is a continuation-in-part application of Ser. No. 731,489 filed on Jul. 17, 1991, now abandoned.

This application relates to aqueous dispersions and aqueous polymeric vehicles of high molecular weight acrylic polymers and a method for making such dispersions and polymeric vehicles. More particularly, this application relates to the formation of aqueous dispersions of water dispersible salts of high molecular weight acrylic polymers from an azeotrope of an organic solvent and water, the azeotrope having a boiling point of not more than about 99° C. The dispersion is formed by mixing a polymer salt, organic solvent and water at a reaction temperature of from about 95° C. to about 98° C. to form a "micro" aqueous dispersion of the polymer salt, and at about the same time forming an azeotrope of the organic solvent and water to remove the organic solvent and to form an aqueous dispersion of the polymer salt having less than about two weight percent organic solvent.

BACKGROUND

For about the last fifty years, protective and decorative coatings based upon acrylic polymers have been increasingly used. These polymers have been utilized in many applications because they have provided a wide range of strength, flexibility, toughness, adhesion, degradation resistance and other film properties. Many acrylics, however, are solution polymers because they are prepared and applied as solutions of organic polymers, in organic solvents. In coatings technology, polymeric vehicles which included thermoplastic acrylic polymers required the use of organic solvents which often are toxic and/or subject to regulation that demand their reduction in coating compositions.

Environmental concern has become increasingly important. This concern not only extends to preservation of the environment for its own sake, but extends to safety for the public as to both living and working conditions. Volatile organic emissions resulting from coating compositions which are applied and used by industry and by the consuming public are often not only unpleasant, but contribute to photochemical smog. Governments have established regulations setting forth guidelines relating to volatile organic compounds (VOCs) which may be released to the atmosphere. The U.S. Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere.

The use of aqueous dispersions of polymeric vehicles, or alternatively, high solids polymeric vehicles are two general approaches that have been used to reduce VOCs in coating compositions. Aqueous systems have limited the molecular weights of the polymers used in the polymeric vehicle. This limited the hardness and other properties of the coating binders and films which resulted from the polymeric vehicles. Moreover, high levels of coalescents often have been required in aqueous thermoplastic vehicles. In water reducible systems with cross-linkers, as opposed to aqueous thermoplastic emulsions, molecular weights of polymers have been kept low and have required cross-linking.

The high solids approach often includes organic solvents or powder coatings. High solids, however, present problems in disposition of the polymeric vehicle. In powder systems requiring heat, disposition efficiency often is less and use of more than one color is difficult. Other high solids systems also may require specialized equipment because of the high solids content and the use of at least some organic solvents which are VOCs.

This invention is directed to aqueous systems which comprise aqueous dispersions of ammonia or amine salts of acrylic polymers which dispersions are low in VOCs and have less than about two weight percent organic solvent. Heretofore as described in the parent application to this application, dispersions of amine salts of high molecular weight acrylic polymers can be made by making the amine salt in a water immiscible solvent, mixing the acrylic polymer salt, water and solvent to form a salt/solvent/water mixture, inverting the mixture to form a solvent in water azeotrope and heating the azeotrope to remove the organic solvent and to provide a low VOC aqueous dispersion of the salt of the acrylic polymer having less than about 2 weight percent of organic solvent. In the latter process, generally water was added to the salified acrylic polymer/organic solvent combination. While the latter process and the dispersion made in the process are unique and advantageously provide extremely useful dispersions which may be used to provide polymeric vehicles and formulated coating compositions, certain problems exist for the process and compositions made by the process. Adding water to the acrylic polymer salt/solvent combination and heating the combination to invert a water in oil to an oil in water emulsion resulted in an undesirable increase in viscosity of the system during the creation of the azeotrope and removal of the organic solvent. This viscosity increase limits the molecular weight of the acrylic polymer salt for the aqueous dispersion. Further, when water is added to the acrylic polymer salt/solvent combination, and the resulting mixture is heated to invert the water in oil emulsion to an oil in water emulsion as well as to remove the organic solvent, there is a tendency for the heated azeotrope to unacceptably foam.

Using amine salts in the process pragmatically limits products to polymeric vehicles and formulated coating compositions which are baked or thermoset. Amine salts of acrylic polymers generally are not suitable for polymeric vehicles and formulated coatings which are to be air dried at ambient temperatures into a film or coating binder. Air drying at ambient temperatures frequently leaves residual amines in the film. These residual amines frequently result in poor film performance and even may be deleterious to the substrate coated by the coating composition. At first blush, ammonia salts of the acrylic polymers would seem an easy answer to the problem of residual high boiling amines in the coating composition. These salts will not result in residual high boiling amines in an air dried coating binder. Ammonia salts of some acrylic polymers, however, will not readily disperse in organic solvents; and as a result, solids levels of these polymeric salts are low (e.g. about 15%). As a result, extraordinary amounts of organic solvent generally would be required to make ammonia salts of acrylic polymers for use in making aqueous dispersions which would be suitable for use in making coating binders, polymeric vehicles and formulated coating compositions. The use of large amounts of organic solvent is not only expensive, but inappropriate with keeping VOC emissions low in manufacturing. Further, as previously noted, many organic solvent systems foam excessively during heating and azeotroping.

It is an object of this invention to provide water dispersions of high molecular weight acrylic polymers which dispersions have low VOCs.

It also is an object of this invention to provide a process for making aqueous dispersions of high molecular weight acrylic polymers which process permits high molecular weight polymers without high processing viscosities, excessive process times and foaming.

It is a further object of this invention to provide a low VOC cross-linkable polymeric vehicle which includes a high molecular weight acrylic polymer which is cured at elevated temperatures; or a polymeric vehicle which may be used in a coating composition which is air dried at ambient temperature.

Still further objects and advantages of the invention will be found by reference to the following description.

SUMMARY OF THE INVENTION

This invention provides a stable water dispersion having less than about two weight percent organic solvent of a high molecular weight amine or ammonia salt of an acrylic polymer having a molecular weight of at least about 12,000, having carboxyl groups and having an acid value in the range of from about 15 to about 100 and preferably not above 75. Further, the dispersion is stable even when it is substantially free of emulsifying agents. The polymeric vehicle of the invention comprises the aforedescribed water dispersion of the water dispersible amine or ammonia salt of the acrylic polymer.

According to the invention, the salt of the acrylic polymer is the reaction product of a neutralization reaction comprising the acrylic polymer, an organic solvent selected from the group consisting of an organic solvent which is substantially water immiscible or ethylene glycol monobutyl ether (which is water miscible at 25° C.) and a salification agent which is an amine or ammonia. The polymer and organic solvent are in a ratio in the range of from about 85/15 to about 60/40 polymer to solvent. In the neutralization reaction, the polymer is salified into an amine or an ammonia salt using the amine or ammonia. In one aspect of the invention, the water dispersion of the water dispersible salt is formed by adding the mixture of the salt of the acrylic polymer and organic solvent to water at a rate of not more than about one-fourth of the salt/organic solvent dispersion per hour. The rate of addition is a function of the rate of the removal of the organic solvent through the heating or distillation of the azeotrope. At all times during the addition, no more than 15 weight percent of the organic solvent, based upon the total weight of organic solvent used to disperse the acrylic polymer, should be in the heated water/organic solvent mixture. As percent of organic solvent which has the acrylic salt or acrylic polymer dispersed therein in the heated water/organic solvent/acrylic polymer and acrylic polymer salt mixture exceeds 15%, the viscosity in the kettle increases to unacceptably high levels. The higher the ratio of solvent to acrylic polymer or salt thereof, the more solvent which has to be azeotrophed to be removed and discarded and the lower the ratio of solvent to acrylic the greater the difficulty of dispensing the polymer in water will be.

The invention includes the process for making the polymeric vehicle of the invention. The process includes mixing the acrylic polymer and the organic solvent in an amount effective to disperse the acrylic polymer in the organic solvent media; and form a dispersion of the polymer in that media. In the process the polymer has a molecular weight of at least about 12,000, has carboxyl groups, and has an acid value of at least about 15. The polymer salt preferably is formed in situ in the organic solvent. In an alternate embodiment of the invention, however, the polymer may be dispersed in the organic solvent and added as described above to water which includes amine or ammonia in an amount effective to neutralize the polymer as described herein.

The amines used to neutralize the polymer have a boiling point in the range of from about 75° C. to about 150° C. with amines having a boiling point in the range of from about 75° C. to about 95° C. being preferred for systems which cure or dry at lower temperatures to permit the amine to be removed from the coating binder during curing or drying. The amine or ammonia salifies the acrylic polymer. The salified polymer and organic solvent are added to and dispersed in a water media or the polymer dispersed in the organic solvent is salified as it is added to the amine or ammonia containing water. An "oil in water" emulsion is formed almost immediately as the polymeric salt/organic solvent or polymer-/organic solvent is added to the water media. After or during the addition of the solvent/polymer mixture to the water, the oil in water emulsion is heated to remove the organic solvent as part of an organic solvent/water azeotrope. The "oil in water" emulsion forms immediately as the organic solvent/acrylic salt mixes with the water or as the polymeric salt forms as it is added to the water because at the temperature range of 92°-98° C., the organic solvent almost immediately strips from the acrylic salt in the form of an azeotrope of organic solvent and water and is driven from the heated reaction vessel. The invention permits manufacture of the dispersion from the polymer using one reaction vessel. When an amine is used with a substantially water immiscible organic solvent, the azeotrope of the substantially water immiscible organic solvent with water has a boiling point of not more than about 95° C., and preferably between about 85° C. to about 95° C. If an ammonia salt is used, ethylene glycol monobutyl ether may be used alone or in combination with the substantially water immiscible organic solvent in amounts effective to form and provide an azeotrope of the ether, water immiscible organic solvent and water with a boiling point of above about 95° C., but not more than about 99° C. and preferably in the range of from about 95° C. to about 98° C. In any aspect of the invention, the organic solvent should have a boiling point of at least above about 100° C. and the amount of water in the salt/solvent/water mixture during the heating or distilling of the azeotrope to remove the organic solvent should be maintained in an amount effective to provide a solids level in the final aqueous dispersion that is desired. The polymeric vehicle of the invention does not require emulsifying agents or coalescents and may be substantially free of them.

The water dispersion and polymeric vehicle of the invention includes the water dispersible salt of the high molecular weight acrylic polymer as well as unsalified polymer, but the aqueous dispersion of the invention does not have less than 60 percent of the free carboxyl groups of the polymer in the aqueous dispersion converted to the amine or ammonia. As the acid number of the polymer goes down, the higher the percent of the carboxyl groups on the acrylic polymer must be neutralized to maintain the dispersion. Below an acid value of about 40, about 100% of carboxyl groups on the polymer should be neutralized into a salt. In an important aspect of the invention, the polymer in the dispersion is about 100% neutralized and the dispersion does not have more than about one pound per gallon of dispersion (120.0 g/l) VOCs. Moreover, even though the aqueous dispersion does not require surfactants or emulsifiers, the water dispersion of the invention is stable through at least 5 freeze-thaw cycles, about −5° C. for the freeze cycle and about 25° C. for the thaw cycle wherein the freeze and thaw cycle are each 24 hours.

An important aspect of the invention is directed to the ammonia salts of the acrylic polymers having carboxyl groups, molecular weights and acid values as aforesaid. Water dispersions of these salts may be used in polymeric vehicles which may be air dried at ambient temperatures. These water dispersions of the invention are the result of adding to water an acrylic polymer ammonia salt or acrylic polymer dispersed in ethylene glycol monobutyl ether or a combination of that ether and a substantially water immiscible organic solvent. If the acrylic polymer, as opposed to the acrylic polymer salt, is dispersed in the organic solvent, the water has ammonia in an amount effective for neutralizing at least 60% of the free carboxyl groups of the polymer as the ammonia salt. The organic solvent/ether/ammonia salt combination is a dispersion of the high molecular weight ammonia salt of the acrylic polymer in a combination of the substantially water immiscible organic solvent and ethylene glycol monobutyl ether. The monobutyl ether may be used as the only organic solvent or preferably it is used in combination with a second organic solvent such as methyl n-amyl ketone. When used in combination with a second solvent, the monobutyl ether should not constitute more than about 25 weight percent of the solvents used and should constitute at least about 10 weight percent of the solvent system. The ether/water immiscible organic solvent/ammonia polymer salt or polymer combination is added to the water at rate of not more than about one-fourth of the amount of the salt/organic solvent dispersion per hour. The weight ratio of organic solvent to polymer or polymer ammonia salt is in the range of from about 85/15 to about 60/40 when the dispersion of polymer/polymer salt/organic solvent is added to the water. The organic solvent/monobutyl ether as a media helps in forming the "oil in water" emulsion as compared to using a substantially water immiscible solvent without the ether. While not intending to be bound by any theory, the ether alters the surface tension of the foam formed in the distillation of the azeotrope, and reduces foaming during distillation. The acrylic polymer in the dispersion has at least 60% of its free carboxyl groups salified to an ammonia salt. The heating and removal of the organic solvent is continued until a water dispersion having less than about 2 weight percent organic solvent is formed.

The invention provides a polymeric vehicle which may be air dried at ambient temperatures or a polymeric vehicle which may be thermoset with a cross-linking agent. In either aspect, the invention provides a formulated coating composition having VOCs of less than one pound per gallon of formulated coating composition, eliminates a need for surfactants and coalescents and includes water dispersible acrylic polymers and salts thereof having a molecular weight of at least about 12,000, but also molecular weights in the range of from about 30,000 to about 300,000. Water dispersions of such high molecular weight acrylic polymers provide an acrylic coating binder with improved film performance characteristics which include, but are not limited to improved lay down performance of the wet film, enhanced film build of the film per pass, faster dry times, improved corrosion resistant films, harder films, more abrasion resistant films, and improved humidity resistant films. The polymeric vehicle of the invention also provides coating binders for improved exterior "ultraviolet resistant" durable films which are derived from an aqueous low VOC formulated coating composition. Films provided from the invention are improved over that of aqueous thermoplastic emulsions or water reducible systems of low molecular weight thermoplastic or those thermosetting polymers requiring cross-linking.

Another important aspect of the invention includes an extended acrylic polymer which is the reaction product of a precursor acrylic polymer and a diisocyanate compound.

Yet another important aspect of the invention, the acrylic polymer includes a chlorinated olefin component which chlorinated product provides increased adhesion to thermoplastic polyolefins such as those commercially available under the names Dexter 813 or Dexter 815 type TPO. These thermoplastic polyolefins are particularly used in the automobile industry such as in making exterior body parts or interior molding where adhesion properties for polymeric vehicles for paint coatings are particularly important.

DESCRIPTION OF THE PREFERRED EMBODIMENTS

As used in this application, "polymer" means a polymer with repeating monomeric units. "Polymeric vehicle" means all polymeric and resinous components in the formulated coating, i.e., before film formation, including but not limited to the water dispersible salt of an acrylic polymer. The polymeric vehicle may include a cross-linking agent. "Coating binder" means the polymeric part of the film of the coating after solvent has evaporated, and with a thermosetting polymeric vehicle after cross-linking. "Formulated coating" means the polymeric vehicle and solvents, pigments, catalysts and additives which may optionally be added to impart desirable application characteristics to the formulated coating and desirable properties such as opacity and color to the film. "VOC" means volatile organic compounds and "low VOC" in connection with a dispersion or formulated coating composition means about 1 pound per gallon or about 120 grams of volatile organic compounds per liter of dispersion or formulated coating composition. "Volatile organic compounds" are defined by the U.S. Environmental Protection Agency ("EPA") as any organic compound which participates in atmospheric photochemical reactions, except for specific designated compounds which have negligible photochemical activity. Water is not a VOC. The following compounds generally have been designated as VOCs. VOCs include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylestersulphuric acid, dimethyl-butanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloro ethane, trichloroethene, 2,3-dimethylbutane, tetrachloroethane, dimethyl-3-methylene-bicyclo-heptane, A-pinene, hexachloro-butadiene, methylnaphthalene, naphthalene, quinoline, methylnaphthalene, phenylpropanone, dimethylbenzene, O-cresol, chloro-methyl-benzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethyl-pyridine, bromobenzene, methylcyclohexane, toluene, chlorobenzene, phenol, 2-methylpyridine, pentene, 1-pentane, bromochloro-propane, 1H-pyrrole, tetrahydrofuran, hexane, 1,4-dichlorobutane, cyclohexane, cyclohexene, pyridine, octane, 1-octene, nonane, dodecane, propene, 2-methyl-1-pentene, 2-methyl-1-propene, isoquinoline, trichlorobenzene, propanal, butanal, 1,4-(dioxane), 1-nonene, decane, dibromochloromethane, 2-chloro-butadiene, tetrachloroethene, dimethyl-methylene-bicyclo-heptane, 1,2-diethylbenzene, (1-methylpropyl)-benzene, Acetic Acid ethyl-ester, 1,3-diethylbenzene, cyclopentene, heptane, cis-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethylcyclo-pentasil-oxane, 1,3-dichlorobenzene, hexadecane, 2-methylthiophene, 3,3-dimethylpentane, 3-methyl-1-butene, 2-methyl-1-butene, 2,2,3-trimethylpentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicyclo-heptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benzenedicarboxal-dehyde, benzoyl nitro peroxide, bromochloropropane, dibromo-chloro-propane, pentachlorobutadiene, dibromochloropropane, 2-butoxyethanol, bromopentachloro ethane, tetradecamethylcycloheptasiloxane, trimethyl-pentanediol, dodecamethyl-cyclo-hexasil-oxane, hexamethylcyclotrisiloxane, octamethylcyclo-tetrasil-oxane, hexadecamethylcyclo-octasil-oxane, tridecane, tetradecane. "Film" is formed by application of the formulated coating to a base or substrate, evaporation of solvent, if present, and cross-linking if a cross-linking resin is present and/or required. "Thermoplastic polymeric vehicle" is a polymeric vehicle which does not require cross-linking to provide a film for a coating binder. "Thermosetting polymeric vehicle" is a polymeric vehicle which requires heat and cross-linking to provide a film for a coating binder.

"Azeotrope" is a mixture of two or more liquids and that mixture behaves as if it were only one liquid, that is, having a distinct boiling point and a defined and constant composition of the two or more liquids which make up the "azeotrope". Although most azeotropes are solutions, cases are encountered in which the azeotrope separates into phases. Such a mixture is a "constant boiling mixture" and for the purposes of this application such a mixture is an azeotrope. In reference to organic solvents, "substantially water immiscible" or "substantially immiscible in water" means that less than 100 g/L of organic solvent is soluble in water at 25° C.

"Acrylic polymer" means a polymer or copolymers of

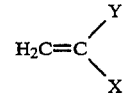

wherein

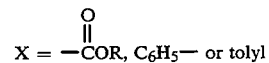

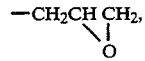

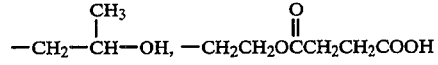

and H n=2 to 7.

In the case of hydroxy-substituted alkyl acrylates the monomers may include members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxy-propyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

"Air dried formulated coating composition" means a formulated coating composition that produces a satisfactory film without heating or baking, but which provides a satisfactory film at ambient temperature such as at about 25° C.

"Water dispersion of an amine or ammonia salt of an acrylic polymer" means a dispersed amine or ammonia salt of an acrylic polymer in a water media.

"Substantially free of emulsifiers" means a composition with not more than about 0.5 weight percent emulsifiers.

An acrylic polymer is substantially completely neutralized if about 100% of its free carboxyl groups are salified.

"Chlorinated polyolefin" means a hydrocarbon which has been grafted with Cl using chlorine and contains from about 15 to about 35 weight percent Cl and where after such grafting the polyolefin will have a molecular weight of at least about 10,000 and preferably in the range of from about 20,000 to about 100,000. Generally these compounds are made by reacting chlorine with a saturated hydrocarbon in a free radical reaction where the Cl replaces a hydrogen in the polymer.

According to the invention, a stable water dispersion of a water dispersible salt of an acrylic polymer is formed by heating a water dispersible salt of an acrylic polymer, water, an organic solvent selected from the group consisting of a substantially water immiscible organic solvent and ethylene glycol monobutyl ether and mixtures thereof and driving off the organic solvent by distillation of the azeotrope formed by the organic solvent and water. Moreover, when an amine is used to make the polymer salt, the organic solvent must azeotrope with water with such azeotrope having a boiling temperature of not more than about 95° C., and preferably in the range of from about 85° C. to about 95° C. In an important aspect of the invention which utilizes the ammonia salt of the acrylic polymer, the organic solvent is a combination of two organic solvents one of which is the substantially water immiscible organic solvent and one of which is ethylene glycol monobutyl ether in an amount of from about 10 to about 25 weight percent of the total organic solvent present, and the azeotrope of the organic solvent/ether/water will have a boiling point in the range of from about 95° C. to about 99° C.

In the aspect of the invention directed to making ammonia salts of the acrylic polymer, when ethylene glycol monobutyl ether is used in combination with a substantially water immiscible organic solvent, it has been surprisingly found that when xylene is added to the distillate in an amount of at least 16 weight percent of the distillate and xylene, the ethylene glycol monobutyl ether becomes immiscible with the water below about 117° C. and readily may be separated from the water in the distillate.

In the aspect of the invention which utilizes the polymeric amine salts, foaming is a problem. Foaming is especially acute for dispersions made with organic solvents which azeotrope with water at a temperature greater than 95° C. In the case of dispersions of the polymeric ammonia salts, foaming is a problem for all solvents. The use of the monobutyl ether which azeotropes with water above about 95° C. and below about 99° C. allows the stripping off of the lower boiling organic solvent/water azeotropes with little or no resulting foaming. Thereafter the stripping off of the monobutyl ether/water azeotrope proceeds with little or no foam. Ethylene glycol monobutyl ether meets all the requirements for a solvent which will provide low VOC aqueous dispersions of ammonia salts of high molecular weight acrylic polymers. This particular ether solubilizes the acrylic ammonia salt, azeotropes with water at a temperature range of from about 95° to about 98° C., can be readily separated from water and acts as a defoamer.

Excess foaming prevented by high stirring rates or excess inert gas sparging often leads to loss of amine or ammonia with a resulting collapse of the dispersion, and at the least, results in increased particle size in the dispersion. While not intending to be bound by any theory, it is believed that in preparing an acrylic dispersion from an acrylic ammonia salt if high stirring rates and/or inert gas sparge are used, the amine or ammonia hydroxide used to make the salt would be swept from the reactor and lost to the dispersion. The incorporation of ethylene glycol monobutyl ether in the solvent mix acts as a defoamer to eliminate foaming during the distillation of the azeotrope. Since the substantially water immiscible organic solvents (i.e. xylene, toluene, methyl n-amyl ketone) azeotrope with water in the boiling point range of 92°-95° C., it is believed that these solvents are removed and the ethylene glycol monobutyl ether is left in the reactor and acts as a defoamer. As the reactor temperature is raised to 96°-98° C. as the organic solvent content is reduced to zero, the ether azeotropes with water and is removed from the system. Foaming is not a problem even at low concentration of the ether left in the reaction, because the ether is an excellent defoamer.

The boiling point of the organic solvent should be at least above about 100° C. to allow an appropriate temperature to polymerize acrylic monomers to a desired molecular weight. Such a boiling point should also be effective for permitting the extension reaction required when the acrylic polymer with an active hydrogen is chain extended with a diisocyanate as hereinafter described. When an amine salt of the acrylic polymer is made, typical organic solvents which may be used in the invention include but are not limited to: aliphatic hydrocarbons such as hexane, VM & P naphtha which is an aliphatic hydrocarbon solvent and Mineral Spirits which has a boiling point of about 165° C.; aromatic hydrocarbons such as toluene, xylene, Aromatic 100*, Aromatic 150*; ketones such as acetone, methyl ethyl ketone, methyl isobutyl ketone, methyl amyl ketone, cyclohexanone, isophorone; and esters such as ethyl acetate, n-butyl acetate, amyl acetate, ethylene glycol monoethyl ether acetate, ethylene glycol monobutyl ether acetate, propylene glycol monomethyl ether acetate with the following solvents being preferred: xylene, methyl-n-amyl ketone, ethoxy ethyl propionate, Mineral Spirits, Aromatic 100, Aromatic 150, Exxate 600** (boiling point of about 165° C. to about 175° C.), Exxate 700 (boiling point of about 180° C. to about 185° C.). After or during the addition of the dispersion of the acrylic polymer and conversion of that polymer to the acrylic polymer salt, or of the dispersion of the acrylic polymer salt, the water/salt/organic solvent mixture undergoes an inversion and forms an oil in water dispersion and an azeotrope. The azeotrope is heated or distilled to drive off the substantially water immiscible organic solvent for a time and temperature sufficient to leave less than 1 pound/gallon of dispersion VOC or at least less than about 2 weight percent organic solvent.
*Aromatic 100 and 150 are trade names of Exxon Chemical Company. Aromatic 100 and Aromatic 150 are aromatic solvents having boiling points of about 185° C. and about 195° C. to about 200° C., respectively.
** Exxate is a trade name of Exxon Chemical Company and Exxate 600 and Exxate 700 are alkyl propionate solvents.

The invention permits aqueous dispersions of acrylic polymers having high molecular weights. These molecular weights may range from about 12,000 to about 300,000. Moreover, from about 5 to about 20 weight percent chlorinated polyolefin may be incorporated into the acrylic polymer by reacting the chlorinated polyolefin with the acrylic polymer or monomers thereof to make the acrylic polymer. The incorporation of chlorinated polyolefin improves the adhesion properties of the polymeric vehicle of the invention, especially to thermoplastic polyolefin substrates as aforesaid.

To permit water dispersibility and neutralization to a salt, the acrylic polymer should have an acid value in the range of from about 15 to about 100 and preferably not more than about 75. In an important aspect of the invention, the amine salt of the acrylic polymer is made by dispersing the acrylic polymer with carboxylic acid functionality into the organic solvent which is substantially immiscible with water. Thereafter the acrylic polymer is neutralized. Thereafter the solvent/acrylic polymer salt dispersion having a ratio in a range of from about 50/50 to about 80/20 organic solvent to polymer and polymer salt is added to water having a pH above about 7 at a rate of from about one-third of the total amount of organic solvent and salt per hour to about one-eighth the total amount of solvent and salt per hour. The pH of the water is raised to above 7 to assure formation and maintenance of the acrylic amine salt. An aqueous solution of ammonium hydroxide having an ammonium hydroxide concentration in the range of from about 0.03 to about 0.10 weight percent may be used, but other basic aqueous solutions such as an aqueous solution of sodium hydroxide or amine may be used. In an important aspect of the invention, the acrylic polymer in the dispersion is substantially completely neutralized with the amine or ammonia and preferably should have excess ammonia or amine added effectively giving about 25% to about 50% more amine or ammonia than required for 100% neutralization of the polymer. This prevents a deficiency of amine or ammonia and a pH drop in the dispersion caused by amine or ammonia loss during distillation and storage. Without excess amine or ammonia, the pH of the dispersion could drop below 7 and destabilize the dispersion. Such excess ammonia or amine is also important when an organic solvent/polymer dispersion is added to the amine or ammonia/water for neutralization of the polymer upon addition to the water.

Amines which may be used in the invention include but are not limited to: triethyl amine, dimethylethanolamine, tributyl amine, n,n-diethyl aniline and n,n-diethyl methyl amine, with triethylamine and dimethylethanolamine being preferred. Although the formation of the amine salt of an acrylic polymer has been described, water dispersible salts other than amine salts may be used in the invention. Amines used to neutralize the polymer preferably should have a boiling point of at least about 75° C.

During the addition of the organic solvent/acrylic polymer salt or organic solvent/unsalified acrylic polymer dispersion to water having a temperature of at least about 92° C. and preferably in the range of from about 92° C. to about 95° C.(or 95°–98° C. when the ether is used), a "micro inversion" takes place almost immediately. That is an oil in water emulsion forms almost immediately with the addition of the dispersion to the water. The viscosity of the oil in water emulsion is in the range of from about 25 cps to about 500 cps. During and immediately after the addition of the dispersion and inversion, the organic solvent is removed by distilling or heating the azeotrope. The distillation occurs between about 92° C. and 95° C. and the temperature is held in that temperature range during the addition of the organic solvent/acrylic dispersion to water. Thereafter the temperature is raised to about 98° C. to about 99° C. to remove any remaining solvent and to reduce VOCs to less than about 1 pound per gallon of dispersion. A column packed with glass or metal saddles preferably is used for this distillation. Additional water is added as needed to allow for the water in the solvent/water azeotrope removed by the heating or distillation. The additional water is added to maintain the dispersion and to provide the desired solids level for the aqueous dispersion after the distillation. By way of example, if there is an initial 2:1 solvent to water ratio, for a 40% solids level in the final aqueous dispersion, it is expected that an additional 60 parts water will have to be added. The organic solvent is removed to provide an aqueous dispersion having not more than about 2 weight percent organic solvent in about 8 to about 10 hours with a solids level in the range of from about 30 to about 40 weight percent.

During the removal of organic solvent and/or the organic solvent/ether combination (if ammonia salts are being dispersed), amine or ammonia also can be removed. The amount of amine lost will be a function of the boiling point of the amine. Loss of amine may affect the stability of the water dispersion of the acrylic polymer because as the molecular weight of the polymer increases and/or acid value of the polymer decreases, the greater percent polymer salt will be required in the aqueous dispersion to maintain the stability thereof. To over come the loss of some of the amine and ammonia during the distillation or heating to remove the organic solvent or ether, water which condenses and separates from the organic solvent contains the amine or ammonia being removed from the dispersion. This amine/ammonia containing water is returned back into the dispersion to not only save on the amount of water used in making the dispersion, but also to overcome the loss of the amine or ammonia from the dispersion. Excess ammonia or amine is added to the aqueous dispersion, as previously described, in an amount effective to maintain the stability of the dispersion. After removal of the organic solvent, the temperature of the system is lowered. In general, sufficient amine is added such that the pH of the aqueous dispersion is above 7, is preferably between about 7 and about 8.5 and most preferably about 8.5. The amine used to neutralize the acrylic polymer may be any mono or even polyamine. If the acrylic polymer has a cross-linking functionality and is to be cross-linked, a cross-linking resin is added.

An important aspect of this invention is a polymeric vehicle which provides a formulated coating composition which has VOCs of 1 pound/gallon or lower and permits formulated coating composition having a solids content of about 30 to about 40 weight percent. The latter solids content permits the use of standard or common coating application equipment without readjustment. Moreover, this aspect of the invention also provides new coating binder and film performances as previously described. Further, improved humidity resistant films and improved exterior "ultra violet" resistant films are obtainable with a low VOC, 30 to 40% solids water dispersed formulated coating composition which includes the salt of the high molecular weight acrylic polymer. The solids content of the formulated coatings composition may go up to about 45 weight percent with pigments. Acrylic polymers of the invention having molecular weights in the range of from about 30,000 to about 300,000 may be used to attain a low VOC formulated coating composition which results in a tough degradation resistant coating binder. The polymeric vehicle and formulated coating composition of the invention reduce or eliminate the need for surfactants and coalescents and are substantially free of them. The polymeric vehicles and formulated coating compositions of the invention may be thermoplastic or may be thermosetting and include cross-linking resins.

In a particularly important aspect of the invention, an acrylic polymer, which could have a lower molecular weight such as below about 12,000 and which would be a precursor acrylic polymer, is subjected to an extension reaction with a polyol such as a diol, triol or with a diisocyanate. As a result, where the extension reaction is with a diisocyanate, the acrylic polymer not only needs a carboxyl functionality to neutralize, but also requires a functionality reactive with isocyanate such as an active hydrogen, hydroxyl or oxirane. In addition to the diisocyanate extension reaction with the low molecular weight acrylic, additional extension can take place if a polyol such as a diol, triol or an amine, diamine or triamine, primary or secondary are added to the acrylic/diisocyanate reaction as co-reactants. The extension reaction provides an extended acrylic polymer having a molecular weight in the range of from about 30,000 to about 300,000 and an acid value of from about 15 to about 100. Diisocyanates and biurets may be used in the extension reaction. Diisocyanates which are particularly important in this aspect of the invention include hexamethylene diisocyanate (HMDI), hexyl diisocyanate (HDI), isophrone diisocyanate (IPDI), tetramethylxylene diisocyanate (TMXDI), toluene diisocyanate (TDI) and hydrogenated methylene diphenyl diisocyanate ($H_{12}MDI$). Polyols which may be used in the invention, but are not limited to, include: trimethyol propane, diethylene glycol, propylene glycol, polyethlene glycols or poly caprolactone polyols. Amines which may be used in the invention, but are not limited to, include: ethyl pentaethylene diamine, menthane diamine polyoxypropylene poly amines, triethanol amine or (1,4-Bis (3-aminopropyl) piperazine).

Where the acrylic polymer is extended with a diisocyanate to provide an isocyanate extended urethane linkage, the polyamine may neutralize the acrylic polymer, but also increases the pH of the mixture of the amine and acrylic polymer in the organic solvent which will drive the isocyanate extension reaction to completion. Thereafter, aqueous ammonium hydroxide or an amine is slowly mixed with the chain extended acrylic polymer to form the salt of that extended polymer, as previously described. The chain extended polymer/organic solvent combination is neutralized as previously described in connection with acrylics which are not extended with an amine having a boiling point of from about 75° C., but not greater than about 150° C. Once the organic solvent has been removed, as previously described, the temperature of the system is reduced. If the acrylic polymer has a cross-linking functionality, a cross-linking resin such as a melamine or isocyanate can be added to form the polymeric vehicle. Typical solids of the polymeric vehicle are in the range of from about 30 to about 40% solids.

The polymeric vehicle of the invention which includes the extended acrylic polymer is made in the same way as when an "unextended" acrylic polymer is used in the invention: the acrylic polymer is dispersed in an organic solvent to provide a dispersion of the polymer to make the salt prior to dispersion in water. The extended acrylic polymer helps to develop ultimate film performance because the molecular weight of the acrylic polymer should be as great as possible. Any extension of the acrylic polymer should be done in the organic solvent phase or media.

The following examples set forth exemplary methods of making the aqueous acrylic dispersions and polymeric vehicles according to the invention.

EXAMPLE 1

(A.) Preparation of the Acrylic Polymer

| Ingredient | Parts |
|---|---|
| A. Xylene | 33.1 |
| B. Methyl n-Amyl Ketone | 16.0 |
| C. Methyl Methacrylate | 8.7 |
| D. Butyl Methacrylate | 0.6 |
| E. Hydroxy ethyl Methacrylate | 1.9 |
| F. Lauryl Methacrylate | 3.5 |
| G. Methacrylic Acid | 5.4 |
| H. Styrene | 21.8 |
| I. t-Butyl Peroxyacetate | 9.0 |

Xylene and the methyl n-amyl ketone are charged into a reactor and heated to a reflux temperature of from about 135° C. to about 140° C.

A premix of ingredients C, D, E, F, G, H and about 80% of I are added dropwise over 4 hours which reaction mix then is held at 135°–145° C. at reflux for about 1 hour. Thereafter, the remaining I (tert-butyl peroxyacetate) is added over three hours. After the addition of ingredient I, the reaction temperature is about 138° C. and thereafter dropped to about 70° C. The resulting acrylic polymer has a Tg of about 20° C.

(B.) Making The Amine Salt And aqueous Dispersion Of The Polymer Of Examples I(A.)

The following ingredients are used to make a water dispersion of an amine salt of the acrylic polymer of Part A.

| Ingredient | Parts |
|---|---|
| J. Acrylic polymer of Example I(A) | 66.6 |
| K. Dimethyethanolamine | 0.7 |
| L. Water (Deionized) | 90.0 |
| M. Ammonium Hydroxide (28% Solution) | 1.0 |
| N. Triethylamine | — |

The water (L) and ammonium hydroxide (M) are charged into a kettle and heated to about 95° C. The acrylic polymer (J) from Example I(A) is added to the kettle of water and ammonium hydroxide over two hours while distilling of the azeotrope of water and methyl n-amyl ketone. During the distillation of the azeotrope of water and xylene/methyl n-amyl ketone, separation of the water from the xylene/methyl n-amyl ketone solvents occurs in the decanter/receiver. The separated water is returned to the kettle to maintain a constant water content in the kettle and to return as much amine lost during the distillation. After all of the acrylic polymer of Example I(A) has been added, distillation of the azeotrope continues until there is less than 2% organic solvent left in the kettle. The temperature is lowered to less than 70° C. The pH and the viscosity of the resulting dispersion (with a solids level of 33.1) is adjusted with the triethylamine and water such that the pH is adjusted to 8–9, a viscosity of Q to R (Gardner-Holdt) and a solids level of about 21% NV.

EXAMPLE II (A.) Preparation of The Acrylic and Chlorinated Olefin Copolymer

| Ingredient | Parts |
|---|---|
| A. Xylene | 17.10 |
| B. Methyl n-Amyl Ketone | 8.55 |
| C. Styrene | 2.38 |
| D. Methyl Methacrylate | 5.80 |
| E. Lauryl Methacrylate | 17.32 |
| F. Methacrylic Acid | 3.07 |
| G. Hardlin 14 LLB (Chlorinated Polyolefin)* | 10.00 |
| H. Hydroxyethyl Acrylate | 1.67 |
| I. t-Butyl Peroctoate | 0.65 |
| J. t-Butyl Peroctoate | 0.06 |
|  | 66.60 |

*This is a polyolefin sold by Tayo Kasei Kogo Co which has 27 ± 1 weight percent chlorine based upon the weight of the resin and which has a molecular weight of about 45,000.

Xylene and the methyl n-amyl ketone are charged into a reactor and heated to a temperature of from about 90° C. to about 95° C.

A premix of ingredients C, D, E, F, G, H and I are added dropwise over two hours which reaction mix then is held at 90°–95° C. for about one hour. Thereafter, the remaining t-butyl peroctoate (J) is added. After the addition of ingredient J, the reaction temperature is 90°–95° C. and thereafter dropped to about 70° C. The resulting acrylic polymer has a Tg of about 10° C.

(B.) Extension Of The Acrylic Polymer, Amine Salification of The Polymer And Making Of The Aqueous Acrylic Polymer Dispersion From An Azeotrope The following ingredients are used to make a water dispersion of an amine salt of the acrylic polymer of Part A.

| Ingredient | Parts |
|---|---|
| J. Methyl pentaethylene diamine | 0.4 |
| K. Tetramethyl Xylene Diisocyanate | 2.9 |
| L. Triethylamine | 2.4 |
| M. Water (Deionized) | 90.0 |
| N. Ammonia Hydroxide (28% Solution) | 1.0 |

Methyl pentaethylene diamine (J) and tetramethyl xylene diisocyanate (K) are added to the reaction product of Part A at 70° C. and held at temperature for about 15 minutes. Thereafter triethylamine (L) is added to the mixture which is held at 70° C. for about 15 minutes after the addition of L. The addition of triethylamine salifies the carboxyl groups on the polymer. Thereafter the temperature of the reaction mixture is raised to about 90° C. and held at that temperature for about ½ hour to complete the reaction of the diisocyanate and the diamine and hydroxyls of the polymer, resulting in an extended polymer salt. The resulting extended polymer salt in solvent is now ready for dispersion in water.

Water (M) and ammonia hydroxide (N) are charged to a clean kettle and the temperature is raised to about 95° C. The extended polymer salt/solvent from above is added to the kettle of water and ammonia hydroxide over two to four hour period, while distilling of the azeotrope of water and xylene/methyl n-amyl ketone-/and toluene (from the Hardlin polyolefin). The dispersion continues as described in the prior example.

(C.) Extension Of The Acrylic Polymer, Ammonia Hydroxide Salification Of The Polymer And Making The Aqueous Acrylic Polymer Dispersion From An Azeotrope The following ingredients are used to make a water dispersion of ammonia hydroxide salt of the acrylic polymer of Part A of Example II.

| Ingredient | Parts |
|---|---|
| J. Methyl pentaethylene diamine | 0.4 |
| K. Tetramethyl Xylene Diisocyanate | 2.9 |
| L. Ethylene glycol monobutyl ether | 10.0 |
| M. Ammonia Hydroxide (28% Solution) | 2.9 |
| N. Water (Deionized) | 87.9 |
| O. Ammonia Hydroxide (28% Solution) | 1.0 |

Methyl pentaethylene diamine (J) and tetramethyl xylene diisocyanate (K) are added to the reaction product of Part A at 70° C. and held at temperature for about 15 minutes. Thereafter the temperature of the reaction mixture is raised to about 90° C. and held at that temperature for about 2 hours to complete the reaction of the diisocyanate and the diamine and hydroxyls of the polymer, resulting in an extended polymer. The temperature of the reaction is then lowered to 80° C. and ethylene glycol monobutyl ether (L) is added, followed by the addition of ammonia hydroxide (M) resulting in a salification reaction between the ammonia and carboxyls of the extended polymer forming an extended polymer salt in immiscible/ether solvents. Dispersion of the resulting extended polymer salt is now carried out as outlined below.

Water (N) and ammonia hydroxide (O) are charged to a clean kettle and the temperature is raised to 92°–95° C., but not greater than 96° C. The extended polymer salt/solvent mixture from above is added to the kettle of water and ammonia hydroxide over a two to four hour period, while distilling of the azeotrope of water and xylene/methyl n-amyl ketone/and toluene (from the Hardlin polyolefin).

After the addition of the polymer salt is completed, the temperature of the reaction is raised to 96°–98° C. to distill the azeotrope of water and ethylene glycol monobutyl ether. The processing of the dispersion continues as described in prior example, reducing the solvent content to less than 2% and then lowering the temperature of the reaction and adjusting with ammonia hydroxide and water the pH and viscosity of the resulting acrylic dispersion.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A process for making a water dispersion of a water dispersible salt of an acrylic polymer, the process comprising:

mixing an acrylic polymer, a base selected from the group consisting of an amine and ammonia, and an organic solvent selected from the group consisting of a substantially water immiscible organic solvent, ethylene glycol monobutyl ether and mixtures thereof in an amount effective to disperse the acrylic polymer in the organic solvent, the organic solvent capable of being separated from water by virtue of its immiscibility therewith, the acrylic polymer having a carboxyl groups, a weight average molecular weight in the range of from about 30,000 to about 300,000 and an acid value in the range of from about 15 to about 100;

salifying the acrylic polymer with the base to provide a salified polymer having at least 60% of the carboxyl groups of the acrylic polymer converted to amine or ammonia salt;

mixing the salified acrylic polymer dispersed in the organic solvent with water or mixing the acrylic polymer dispersed in the organic solvent with water to provide a salified polymer/organic solvent/water azeotropic mixture having a boiling point in the range of from about 85° C. to about 99° C.; and heating the azeotropic mixture to remove the organic solvent; condensing the organic solvent being heated and removed from the azeotropic mixture; separating the condensed organic solvent from water which has been removed with the organic solvent; and returning the separated water to the azeotropic mixture to provide an aqueous dispersion of the salt of the acrylic polymer having at least 30 weight percent acrylic polymer and salt thereof as solids and less than 2 weight percent of the organic solvent, and having at least 60% of the carboxyl groups of the acrylic polymer converted to an amine or ammonia salt.

2. A process as recited in claim 1 wherein the carboxyl groups of the acrylic polymer are about 100% neutralized to an amine or ammonia salt and wherein the acrylic polymer is salified to an amine or ammonia salt in the organic solvent to provide a dispersion of the salt of acrylic polymer in the organic solvent, the dispersion of the salt and organic solvent being added to the water.

3. A process as recited in claim 1 wherein the carboxyl groups of the acrylic polymer are about 100% neutralized to an amine or ammonia salt and wherein the acrylic polymer is dispersed in the organic solvent to provide an acrylic polymer/organic solvent dispersion, the acrylic polymer/organic solvent dispersion being added to the water which includes the amine or ammonia in an amount effective for neutralizing the acrylic polymer.

4. A process as recited in claims 1 or 3 wherein the salified acrylic polymer or the acrylic polymer dispersed in the organic solvent is added to water and the base is an amine having a boiling point of at least about 75° C. and the azeotrope having a boiling point in the range of from about 85° C. to about 95° C.

5. A process as recited in claims 1 or 3 wherein the salified acrylic polymer or the acrylic polymer dispersed in the organic solvent is added to water and the polymer is salified with ammonia and the organic solvent is a mixture of at least two organic solvents, one of which is ethylene glycol monobutyl ether, the mixture of solvents comprising from about 10 to about 25 weight percent ethylene glycol monobutyl ether, based upon the weight of the solvent.

6. A process as recited in claims 1 or 3 wherein the salified acrylic polymer or the acrylic polymer dispersed in the organic solvent is added to water and the acrylic polymer has an acid value in the range of from about 15 to about 75.

7. A process as recited in claims 1 or 3 wherein the salified acrylic polymer or the acrylic polymer dispersed in the organic solvent is added to water and the acrylic polymer comprises from about 5 to about 20 weight percent chlorinated polyolefin.

8. A process as recited in claim 1 or 3 wherein the salified acrylic polymer or the acrylic polymer dispersed in the organic solvent is added to water and the acrylic polymer is the reaction product of an extension reaction of a precursor acrylic polymer and diisocyanate.

9. A process as recited in claim 4 wherein the acrylic polymer has an acid value in the range of from about 15 to about 75.

10. A process as recited in claim 5 wherein the acrylic polymer has an acid value in the range of from about 15 to about 75.

11. A process as recited in claim 8 wherein the acrylic polymer has an acid value in the range of from about 15 to about 75.

12. A process as recited in claim 1 wherein the organic solvent includes ethylene glycol monobutyl ether and wherein after heating the azeotropic mixture the ethylene glycol monobutyl ether is separated from the water by mixing the organic solvent with xylene or by lowering the temperature of the organic solvent.

13. A process as recited in claim 5 wherein the ethylene glycol monobutyl ether is separated from the water by mixing the organic solvent with xylene or by lowering the temperature of the organic solvent.

14. The process as recited in claim 13 wherein during the addition to the water not more than about 15 weight percent of the organic solvent, based upon the weight of the organic solvent in the dispersion, is in the mixture of the water and organic solvent.

* * * * *